(12) United States Patent
Singh et al.

(10) Patent No.: US 8,812,707 B2
(45) Date of Patent: Aug. 19, 2014

(54) TRANSMITTING INTERNET PROTOCOL OVER SCSI IN A HIGH AVAILABILITY CLUSTER

(75) Inventors: Animesh Singh, Bangalore (IN); Venkata Kumar Duvvuru, Nellore (IN)

(73) Assignee: LSI Corporation, San Jose, CA (US)

( * ) Notice: Subject to any disclaimer, the term of this patent is extended or adjusted under 35 U.S.C. 154(b) by 297 days.

(21) Appl. No.: 13/115,418

(22) Filed: May 25, 2011

(65) Prior Publication Data

US 2012/0303701 A1    Nov. 29, 2012

(51) Int. Cl.
*G06F 15/16* (2006.01)
*G06F 15/173* (2006.01)
*G06F 3/00* (2006.01)
*G06F 13/00* (2006.01)
*H04L 12/16* (2006.01)
*H04L 12/28* (2006.01)

(52) U.S. Cl.
USPC ........... 709/230; 709/204; 709/223; 709/225; 709/227; 709/238; 709/239; 709/250; 719/326; 370/254; 370/260

(58) Field of Classification Search
USPC ................. 709/204, 223, 230, 238, 239, 250; 719/326

See application file for complete search history.

(56) References Cited

U.S. PATENT DOCUMENTS

| 6,317,837 | B1 * | 11/2001 | Kenworthy | 726/11 |
|---|---|---|---|---|
| 6,470,397 | B1 | 10/2002 | Shah et al. | |
| 7,437,477 | B2 * | 10/2008 | Kuik et al. | 709/238 |
| 7,506,039 | B2 * | 3/2009 | Hammons et al. | 709/223 |
| 7,917,682 | B2 | 3/2011 | Bakthavathsalam | |
| 2007/0162631 | A1 * | 7/2007 | Balakrishnan et al. | 710/15 |
| 2012/0159245 | A1 * | 6/2012 | Brownlow et al. | 714/23 |

* cited by examiner

*Primary Examiner* — Un C Cho
*Assistant Examiner* — Peian Lou
(74) *Attorney, Agent, or Firm* — Suiter Swantz pc llo

(57) ABSTRACT

A system may include information handling system devices connected together to form a computing cluster utilizing a SCSI interface. Each one of the information handling system devices may include an operating system kernel having a SCSI networking module for encapsulating Internet Protocol (IP) packets for transmitting between the information handling system devices. The system may also include SCSI hardware for connecting the information handling system devices together. The SCSI hardware may be configured to transmit the encapsulated IP packets between the information handling system devices.

10 Claims, 3 Drawing Sheets

TRANSMITTING INTERNET PROTOCOL OVER SCSI IN A HIGH AVAILABILITY CLUSTER

TECHNICAL FIELD

The present disclosure generally relates to the field of electronic storage, and more particularly to a system and method for running network services over Small Computer System Interface (SCSI) hardware.

BACKGROUND

High-Availability (HA) computer clusters utilize redundant computers or nodes to provide high availability services. Generally, HA solutions require a dedicated network of devices that support Internet Protocol (IP). The dedicated IP network is utilized for supporting clustering traffic across all nodes in the cluster. Such IP networks are safeguarded against failure with redundant hardware and associated software, which add to the cost and management requirements associated with this type of implementation. Further, such networks typically require a dedicated networking hardware and additional software to provide a synchronization mechanism between Input/Output (I/O) components and HA components to handle unexpected network behavior.

SUMMARY

A system for running network services over Small Computer System Interface (SCSI) hardware may include a plurality of information handling system devices connected together to form a computing cluster utilizing a SCSI interface. Each one of the plurality of information handling system devices may include an operating system kernel having a SCSI networking module for encapsulating Internet Protocol (IP) packets for transmitting between the plurality of information handling system devices. The system may also include SCSI hardware for connecting the plurality of information handling system devices together, where the SCSI hardware is configured to transmit the encapsulated IP packets between the plurality of information handling system devices.

A method for running network services over Small Computer System Interface (SCSI) hardware may include clustering a plurality of information handling system devices utilizing a SCSI interface. Each one of the plurality of information handling system devices may include an operating system kernel having a SCSI networking module. The method may also include encapsulating Internet Protocol (IP) packets for transmission between the plurality of information handling system devices utilizing the SCSI networking module. The method may further include transmitting the encapsulated IP packets between the plurality of information handling system devices utilizing the SCSI interface.

A system for running network services over Small Computer System Interface (SCSI) hardware may include a plurality of information handling system devices connected together to form a computing cluster utilizing a SCSI interface. Each one of the plurality of information handling system devices may include an operating system kernel having a SCSI networking module for encapsulating Internet Protocol (IP) packets for transmitting between the plurality of information handling system devices. The system may also include SCSI hardware for connecting the plurality of information handling system devices together. The SCSI hardware may be configured to transmit the encapsulated IP packets between the plurality of information handling system devices. A SCSI address for at least one of the plurality of information handling system devices may be utilized as a Media Access Control (MAC) for the at least one of the plurality of information handling system devices.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
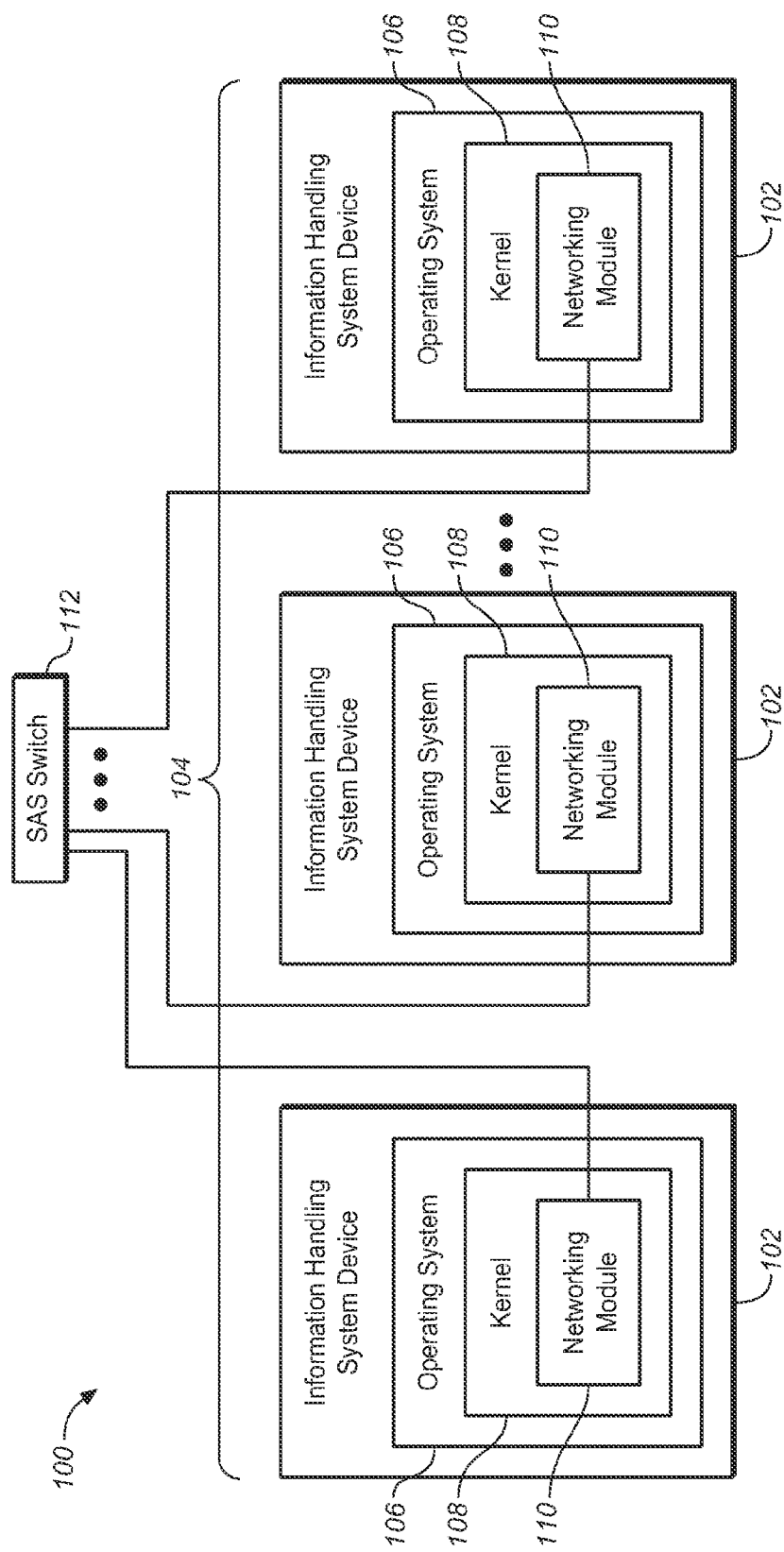
FIG. 1 is a block diagram illustrating a system for running network services over Small Computer System Interface (SCSI)/Serial Attached SCSI (SAS) hardware.
Figure 2:
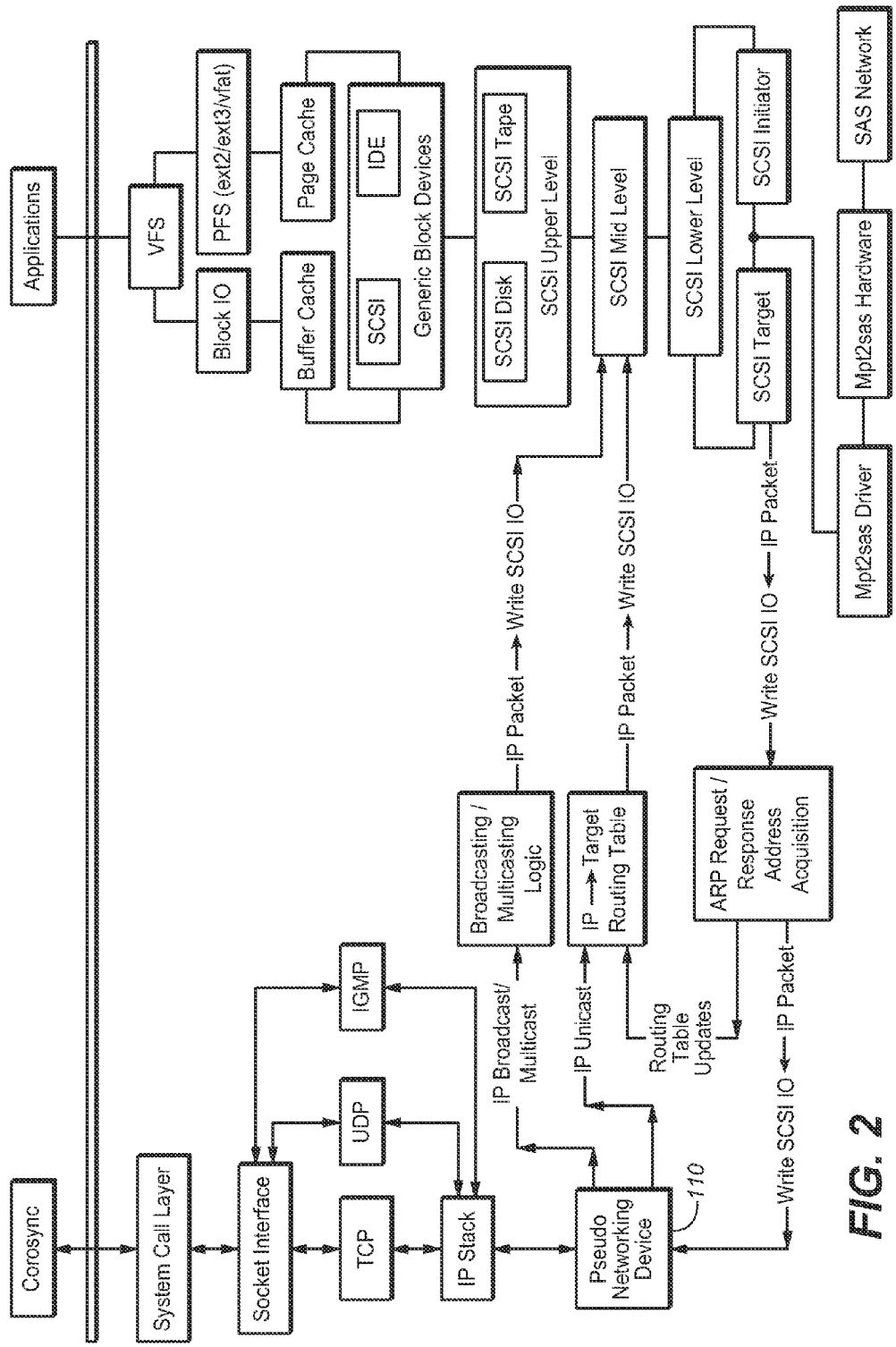
FIG. 2 is a block diagram illustrating a pseudo networking device for the system illustrated in FIG. 1.

Reference will now be made in detail to the subject matter disclosed, which is illustrated in the accompanying drawings.

Referring generally to FIGS. 1 through 4, a system 100 for running network services over Small Computer System Interface (SCSI) hardware is described. The system 100 includes a number of information handling system devices 102 connected together to form a computing cluster 104 utilizing a Serial Attached SCSI (SAS) interface. In embodiments, the various information handling system devices 102 may be implemented as any type of electronic device having the ability to store, retrieve, and/or process data (e.g., a desktop computer, a laptop computer, and/or a server). Each one of the information handling system devices 102 includes an operating system 106 having an operating system kernel 108. The operating system kernel 108 includes a networking module, such as an SAS networking module 110, for encapsulating Internet Protocol (IP) packets for transmitting between the information handling system devices 102. The system 100 also includes networking hardware, such as SAS hardware (e.g., SAS switch 112), for connecting the information handling system devices 102 together. The SAS hardware/SAS switch 112 is configured to transmit the encapsulated IP packets between the information handling system devices 102. Thus, the system 100 may utilize SAS as a networking device to transmit IP over SAS. However, it should be noted that SAS is provided by way of example only and is not meant to be limiting of the present disclosure. For example, the system 100 may also utilize parallel SCSI as a networking device to transmit IP packets.

In embodiments, the system 100 may provide clustering capabilities between external controllers connected to a common SAS backend without requiring dedicated High-Availability (HA) networking hardware (e.g., Ethernet or Infiniband) between the individual information handling system devices 102. In embodiments, the SAS backend may be implemented utilizing a high speed Input/Output (I/O) network in a redundant configuration supported with multipath software. By utilizing a pseudo networking device such as the SAS networking module 110 described in FIG. 2 to plumb a Transmission Control Protocol (TCP)/IP stack with SAS hardware and software, extra hardware for supporting high availability traffic may be eliminated, reducing the cost and/or management complexity of a multi-nodal computing cluster architecture over that of a dedicated HA network, for example. Further, the clustering capability may be implemented in a scale out environment, where more nodes may be added to increase the capacity of the computing cluster 104 as needed.

The SAS networking module 110 may be implemented as a kernel module as part of the networking stack of the operating system 106. In embodiments, the SAS networking module 110 encapsulates incoming IP packets inside a SCSI Command Descriptor Block (CDB). After encapsulating each IP packet inside a CDB, the SAS networking module 110 identifies the target (e.g., an SAS Host Bus Adapter (HBA) in the cluster network) to which the CDB packet is to be sent. In example implementations, the SAS networking module 110 maintains a mapping/routing table of IP addresses to SAS targets. The SAS HBA targets may be identified from normal disk targets by a special signature. For example, when the computing cluster 104 is initialized, the nodes participating in the network may be assigned an IP address dynamically.

In embodiments, an IP address may be acquired by a node uniquely without utilizing Dynamic Host Configuration Protocol (DHCP). This may allow nodes to join and leave the cluster dynamically, offering greater flexibility with respect to cluster configuration. The SAS address World Wide Name (WWN) of each node may be utilized as a Media Access Control (MAC) address, as each SAS address will be unique within the computing cluster 104. For example, the WWN for each node may be available as part of SCSI inquiry data utilized by peers to construct a routing table once the presence of an initiator-target pair in the SAS topology is detected. In embodiments, the introduction of an initiator-target pair in the SAS topology may be detected by an SAS announcement indicating the presence of a new target in the topology. In some instances, the computing cluster 104 may utilize Address Resolution Protocol (ARP) to determine a hardware address/MAC address for a node based upon the IP address of the node, while in other instances, the computing cluster 104 may utilize Reverse ARP (RARP), where a node may request its own IP address based upon, for instance, the MAC address of the node.

In embodiments, communication between information handling system devices 102 within the SAS/SCSI network may be accomplished utilizing the SCSI protocol, where communication is carried out between an initiator and a target. For example, the computing cluster 104 may allow the information handling system devices 102 to identify peers/counterparts in the SAS backend. In a specific implementation, target mode emulation in the SAS HBA enables an initiator to be simultaneously utilized as a target. It should be noted that utilizing the target mode emulation feature may provide full duplex communication between the SAS HBAs. For example, outgoing network traffic may be translated to a SCSI Write I/O request from an initiator to the target of the receiving counterpart. Further, an incoming IP packet may arrive at a target node in the form of a SCSI Write I/O request to the hosted target. The incoming IP packet may then be translated to a networking buffer (e.g., in the case of a Linux operating system implementation). In embodiments, MAC address to target mapping may be maintained internally within, for example, a routing table at each node. The routing table may be utilized to translate outgoing IP packets to Write I/O request for appropriate targets.

In some implementations, multicast and/or broadcast emulation may be provided by the computing cluster 104 to support cluster and networking mechanisms. Because SAS is a point-to-point protocol, in embodiments, the system 100 may emulate broadcast/multicast by providing individual I/O requests to all known entities in the computing cluster 104. For example, the SAS network may utilize Single Route I/O Virtualization (SRIOV) in an Open Service Architecture (OSA) environment to segregate block I/O and cluster traffic on SAS Input/Output Controllers (IOCs) utilizing a dedicated Virtual Function (VF), or the like.

Figure 3:
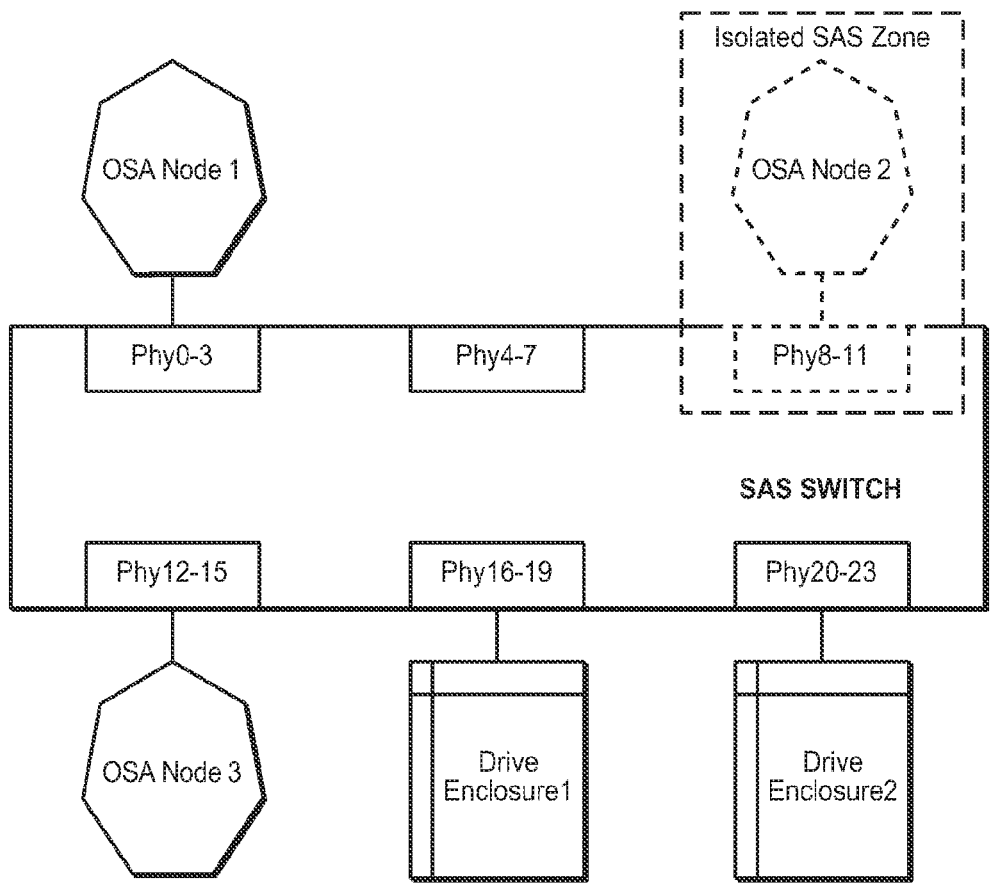
FIG. 3 is a block diagram illustrating SAS zoning for the system illustrated in FIG. 1.

In embodiments, the computing cluster 104 may utilize SAS zoning to isolate one or more ports associated with a failed node within the cluster, as illustrated in FIG. 3. For example, in-band SAS zoning may be utilized to achieve isolation of physical layer devices (Phys) utilizing Serial Management Protocol (SMP). This may include source port virtualization, as well as providing an SAS Domain Manager (SDM) framework to authenticate and route zoning requests to the SAS switch 112. In embodiments, inclusion of the ports back into the general SAS network may only be allowed when the node has rejoined the cluster and indicated that it has optimal health. In some implementations, a hypervisor may be utilized at each node to freeze errant Virtual Machines (VMs). The hypervisor may provide logical isolation between information handling system devices 102 within the SAS/SCSI network.

Figure 4:
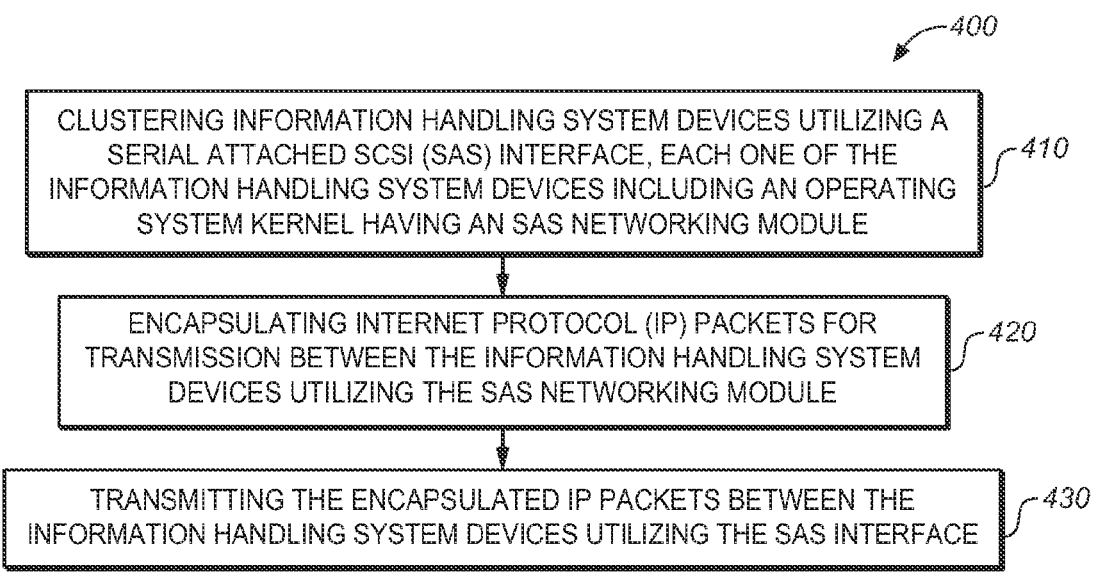
FIG. 4 is a flow diagram illustrating a method for running network services over SCSI/SAS hardware.

Referring now to FIG. 4, a method 400 for running network services over Small Computer System Interface (SCSI) hardware may include clustering information handling system devices utilizing a Serial Attached SCSI (SAS) interface, where each one of the information handling system devices includes an operating system kernel having an SAS networking module, 410. The method 400 may also include encapsulating Internet Protocol (IP) packets for transmission between the information handling system devices utilizing the SAS networking module, 420. The method 400 may further include transmitting the encapsulated IP packets between the information handling system devices utilizing the SAS interface. In embodiments, method 400 may be utilized with storage systems including, but not limited to, external, internal/Direct-Attached Storage (DAS), RAID, Network-Attached Storage (NAS), and Storage Area Network (SAN) systems and/or networks. However, this list is provided by way of example only, and is not meant to limit the present disclosure. Thus, the methods of the present disclosure may be utilized with other storage systems as well. Further, SAS is provided by way of example only and is not meant to be limiting of the present disclosure. Thus, other types of SCSI interfaces may be utilized as well. For example, the system 100 may utilize a parallel SCSI interface and a parallel SCSI networking module in accordance with the present disclosure.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method, comprising:
    clustering a plurality of information handling system devices utilizing a Small Computer System Interface (SCSI) interface, each one of the plurality of information handling system devices including an operating system kernel having a SCSI networking module;
    encapsulating Internet Protocol (IP) packets inside a command descriptor block (CDB) packet for transmission between the plurality of information handling system devices utilizing the SCSI networking module;
    upon encapsulating the Internet Protocol (IP) packets inside the command descriptor block packet, identifying a target of the plurality of information handling system devices to which the encapsulated IP packets are to be transmitted;
    designating a SCSI address for at least one of the plurality of information handling system devices as a Media Access Control (MAC) for the at least one of the plurality of information handling system devices;
    simultaneously designating an initiating one of the plurality of information handling system devices as another target for another Command Descriptor Block (CDB) packet by another initiating one of the plurality of information handling system devices; and
    transmitting the encapsulated IP packets between the plurality of information handling system devices utilizing the SCSI interface.

2. The method of claim 1, further comprising:
    emulating at least one of multicasting or broadcasting by providing a plurality of individual I/O requests to the plurality of information handling system devices.

3. The method of claim 1, further comprising:
    transmitting one of the encapsulated IP packets in the form of a SCSI Write I/O request to one of the plurality of information handling system devices.

4. The method of claim 1, further comprising:
    segregating block I/O and cluster traffic within the computing cluster utilizing Single Route I/O Virtualization (SRIOV).

5. The method of claim 1, further comprising:
    zoning the plurality of information handling system devices to isolate a port associated with a failed node.

6. A system, comprising:
    a plurality of information handling system devices connected together to form a computing cluster utilizing a Small Computer System Interface (SCSI) interface, each one of the plurality of information handling system devices including an operating system kernel having a SCSI networking module stored within a particular information handling system device, the SCSI networking module configured for:
        encapsulating Internet Protocol (IP) packets inside a command descriptor block (CDB) packet to be transmitted between the plurality of information handling system devices;
        upon encapsulating the Internet Protocol (IP) packets inside the command descriptor block packet, identifying a target of the plurality of information handling system devices to which the encapsulated IP packets are to be transmitted; and
        utilizing target mode emulation to simultaneously designate an initiating one of the plurality of information handling system devices as another target for another Command Descriptor Block (CDB) packet by another initiating one of the plurality of information handling system devices; and
    SCSI hardware for connecting the plurality of information handling system devices together, where the SCSI hardware is configured to transmit the encapsulated IP packets between the plurality of information handling system devices, wherein a SCSI address for at least one of the plurality of information handling system devices is utilized as a Media Access Control (MAC) for the at least one of the plurality of information handling system devices.

7. The system of claim 6, wherein the SCSI networking module provides at least one of multicast or broadcast emulation by providing a plurality of individual I/O requests to the plurality of information handling system devices in the computing cluster.

8. The system of claim 6, wherein one of the encapsulated IP packets is transmitted in the form of a SCSI Write I/O request to one of the plurality of information handling system devices.

9. The system of claim 6, wherein the computing cluster utilizes Single Route I/O Virtualization (SRIOV) to segregate block I/O and cluster traffic within the computing cluster.

10. The system of claim 6, wherein the computing cluster implements zoning to isolate a port associated with a failed node within the computing cluster.

\* \* \* \* \*